United States Patent
De Magalhaes (10) Patent No.: US 9,893,936 B2
(45) Date of Patent: *Feb. 13, 2018

(54) DYNAMIC MANAGEMENT OF RESTFUL ENDPOINTS

(71) Applicant: International Business Machines Corporation, Armonk, NY (US)

(72) Inventor: Arthur L. De Magalhaes, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,210

(22) Filed: Aug. 31, 2015

(65) Prior Publication Data

US 2016/0087852 A1   Mar. 24, 2016

Related U.S. Application Data

(63) Continuation of application No. 14/494,633, filed on Sep. 24, 2014.

(51) Int. Cl.
   *H04L 12/24*   (2006.01)
   *H04L 29/08*   (2006.01)
   *G06F 9/50*    (2006.01)

(52) U.S. Cl.
   CPC ............ *H04L 41/0806* (2013.01); *G06F 9/50* (2013.01); *H04L 67/02* (2013.01); *H04L 67/10* (2013.01); *H04L 67/327* (2013.01)

(58) Field of Classification Search
   CPC ..... H04L 41/0806; H04L 67/02; H04L 67/10; H04L 67/327; G06F 9/50
   See application file for complete search history.

(56) References Cited

U.S. PATENT DOCUMENTS

| 8,375,358 B2 * | 2/2013 | Baldwin | G06F 8/38 717/114 |
| 8,589,345 B2 * | 11/2013 | Gupta | G06F 17/30194 707/625 |
| 8,627,442 B2 | 1/2014 | Ji et al. | |

(Continued)

OTHER PUBLICATIONS

Hunt, Bryan, "Miles to Code Before I Sleep—It's all about the code.", Posted on Jun. 30, 2011, pp. 1-23, <http://bryanhunt.wordpress.com/2011/06/30/osgi-at-rest/>.

(Continued)

*Primary Examiner* — Arvin Eskandarnia
*Assistant Examiner* — Javier O Guzman
(74) *Attorney, Agent, or Firm* — Noah A. Sharkan; Brian M. Restauro (57) ABSTRACT

Embodiments of the present invention disclose methods, systems, and program products for dynamically managing RESTful endpoints. In one embodiment, an application server provides dynamic management of RESTful endpoint, including the ability to re-use the same resource information for multiple endpoints across multiple routers, allowing for applications aliases or sharing routing capability between applications. Yet other embodiments of the present invention can provide a high availability application server system and/or failover support for routers and resources, as well as the ability to remotely add new containers and resources to the application server.

7 Claims, 4 Drawing Sheets

(56) References Cited

U.S. PATENT DOCUMENTS

| | | | |
|---|---|---|---|
| 8,706,800 B1* | 4/2014 | Ahmed | G06F 9/468 709/201 |
| 9,088,463 B1* | 7/2015 | Boynes | H04L 67/2842 |
| 2003/0005181 A1* | 1/2003 | Bau, III | G06F 8/34 719/330 |
| 2008/0049779 A1 | 2/2008 | Hopmann et al. | |
| 2008/0140857 A1* | 6/2008 | Conner | G06Q 10/00 709/236 |
| 2009/0249370 A1* | 10/2009 | Liu | G06F 9/5038 719/330 |
| 2010/0030881 A1* | 2/2010 | Moreira Sa de Souza | H04L 29/08846 709/223 |
| 2011/0041171 A1* | 2/2011 | Burch | H04L 63/08 726/7 |
| 2011/0321032 A1* | 12/2011 | Ciccone | G06F 9/445 717/171 |
| 2012/0016999 A1* | 1/2012 | Kieselbach | G06F 17/30607 709/229 |
| 2012/0221522 A1* | 8/2012 | Allman | G06F 17/30578 707/624 |
| 2012/0233589 A1* | 9/2012 | Mruthyunjaya | G06F 8/30 717/105 |
| 2012/0311611 A1* | 12/2012 | Wang | G06F 9/547 719/318 |
| 2014/0033170 A1 | 1/2014 | Nimashakavi et al. | |
| 2014/0115017 A1* | 4/2014 | Pasternak | G06F 17/3089 707/827 |
| 2014/0143244 A1* | 5/2014 | Satish | G06F 17/30867 707/728 |

OTHER PUBLICATIONS

Peters, Eric, "New in V8.5.5.Next Alpha (February update)", Feb. 28, 2014, IBM developerWorks / Developer Centers, pp. 1-12, <https://developer.ibm.com/wasdev/docs/new-in-v8-5-5-next-alpha/>, Grace Period Disclosure.

Staudacher, Holger, "OSGi JAX-RS connector: Publishing REST services", published: Jan. 23, 2012, © EclipseSource 2008-2013, pp. 1-9, <http://eclipsesource.com/blogs/2012/01/23/an-osgi-jax-rs-connector-part-1-publishing-rest-services/>.

"Build a RESTful Web service—An introduction to REST and the Restlet framework", IBM®, developerWorks, Jul. 22, 2008, pp. 1-17, <http://www.ibm.com/developerworks/java/tutorials/j-rest/j-rest.html>.

"Introduction to REST Endpoints", GitHub, Mach-II / Mach-II-Framework, thofrey edited this page on Apr. 1-8 revisions, © 2014 GitHub, Inc., pp. 1-14, <https://github.com/Mach-II/Mach-II-Framework/wiki/Introduction-to-REST-Endpoints>.

"Java API for RESTful Services (JAX-RS)", provided by inventor in disclosure on Mar. 27, 2014, 1 page, <https://jax-rs-spec.java.net/>.

"The Leading Web API Platform for Java", Restlet—REST Framework for Java & PaaS for Web APIs, provided by inventor in disclosure on Mar. 27, 2014, pp. 1-2, <http://restlet.com/>.

De Magalhaes, Arthur L., "Dynamic Management of Restful Endpoints", U.S. Appl. No. 14/494,633, filed Sep. 24, 2014, pp. 1-26.

IBM Patents or Patent Applications Treated as Related, Appendix P, dated Aug. 31, 2015. pp. 1-2.

\* cited by examiner

DYNAMIC MANAGEMENT OF RESTFUL ENDPOINTS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:
(i) "New in V8.5.5.Next Alpha (February update)", Peters, Eric, Feb. 28, 2014, available at https://developer.ibm.com/wasdev/docs/new-in-v8-5-5-next-alpha/.

BACKGROUND OF THE INVENTION

The present invention relates generally to the field of application server software, and more particularly to dynamic management of endpoints within application server software that comply with representational state transfer protocol.

Representational state transfer (REST) is an architectural style consisting of a coordinated set of architectural constraints applied to components, connectors, and data elements, within a distributed hypermedia system. Environments and endpoints that comply with the restraints of the REST abstraction are called "RESTful" environments and endpoints. REST includes several formal architectural constraints including (i) a uniform interface separating clients from servers, and (ii) stateless protocol (i.e., each request from any client contains all the information necessary to service the request). A RESTful endpoint is a connection point that manages access to one or more resources (i.e., a source of information that can be addressed using a uniform resource identifier (URI), such as a URL). RESTful endpoints exchange representations of resources to which they address. A representation is a document containing data provided by the resource, including associated metadata. When a resource identified by the URI is accessible by one or more clients, the endpoint is said to be "exposed." A common approach to exposing RESTful endpoints is through static applications, such as enterprise archive (EAR) files or web application archive (WAR) files, where the endpoints are pre-defined during the compilation of the code.

The World Wide Web evolved from a system of linked static hypertext documents to a system of linked pages that can include dynamic updates of webpages using web applications and scripting languages, such as JavaScript®, and mark up languages, such as XML®. Web application servers, or application servers, efficiently execute procedures (e.g., programs, routines, and scripts) for supporting the web applications that the web application server supports.

SUMMARY

Embodiments of the present invention provide methods, systems, and program products for dynamically managing RESTful endpoints. According to one aspect of the present invention, a method is provided comprising: receiving, by one or more computer processors, a REST request using a proxy, wherein the proxy is a first modular application component that receives REST requests associated with a context root; determining, by one or more computer processors, a third modular application component from a plurality of modular application components for processing the REST request using a second modular application component, wherein the second modular application component selects the third modular application component for processing the REST request using one or more heuristic matching techniques; and processing, by one or more computer processors, the REST request using at least the third modular application component.

DETAILED DESCRIPTION

Embodiments of the present invention recognize that typical approaches for exposing RESTful endpoints (e.g., through EAR or WAR file upload) pre-define the endpoints at the time of code compilation. These methods of exposing the endpoints do not allow for dynamic management of the endpoints. Dynamic, in the context of exposing RESTful endpoints, means that endpoints may be added, removed, and/or modified without (i) stopping and restarting the application server that is executing an endpoint application or (ii) recompiling the application server or any of the part thereof. Embodiments of the present invention disclose an application server that provides dynamic management of RESTful endpoints. Some embodiments of the present invention further provide the ability to re-use the same resource information for multiple endpoints across multiple routers, allowing for applications aliases or sharing routing capability between applications, which is particularly useful in enterprise computing environments. Yet other embodiments of the present invention can provide a high availability application server system and/or failover support for routers and resources. Further embodiments of the present invention provide the ability to remotely add new containers and resources to the application server.

Figure 1:
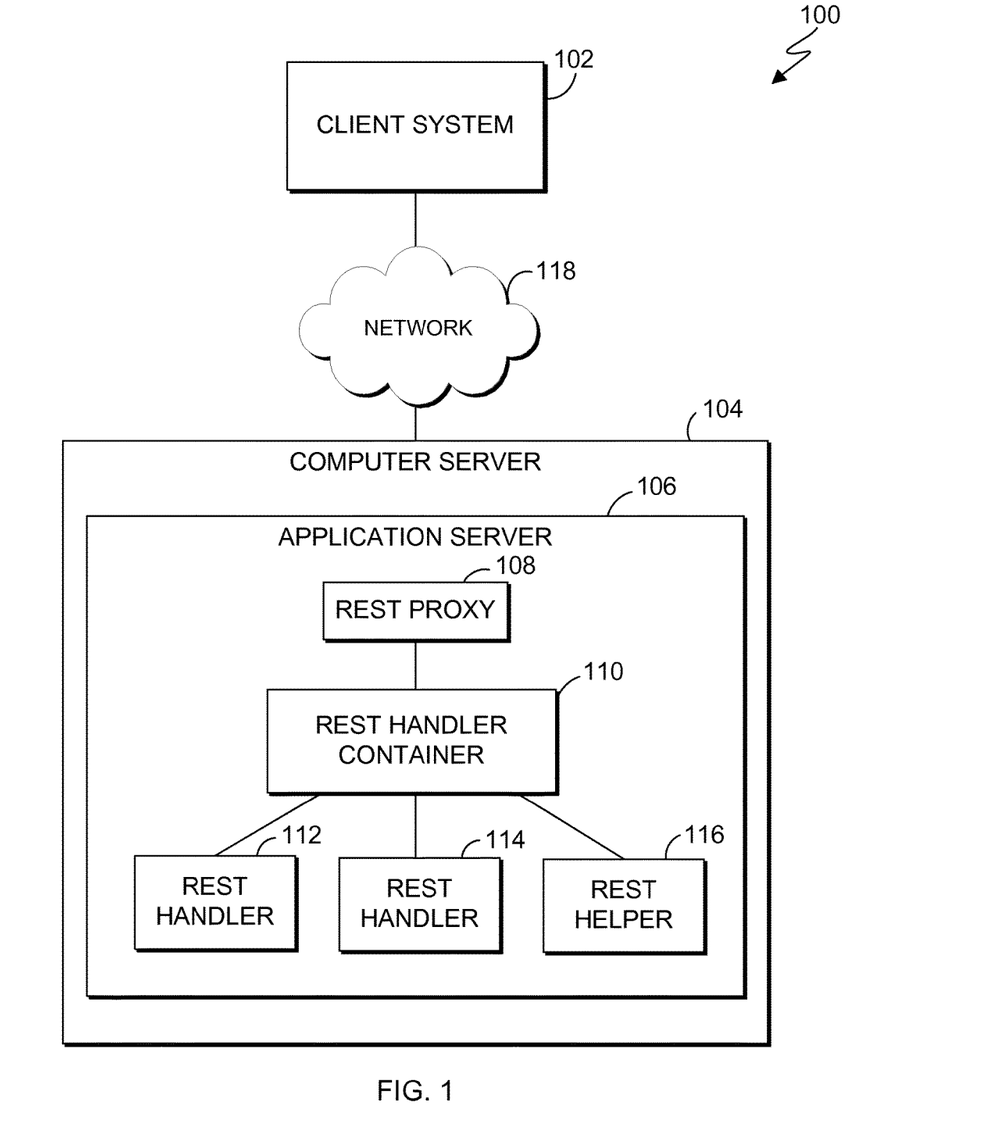
FIG. 1 is a functional block diagram illustrating a RESTful client-server environment, in accordance with an embodiment of the present invention.

Embodiments of the present invention will now be discussed with respect to the several Figures. FIG. 1 is a functional block diagram illustrating a RESTful client-server environment ("environment"), generally designated 100, in accordance with an embodiment of the present invention. Environment 100 includes client system 102 and computer server 104 connected over network 118. Network 118 can be, for example, a local area network (LAN), a wide area network (WAN), such as the Internet, a dedicated short range communications network, or any combination thereof, and may include wired, wireless, fiber optic, or any other connection known in the art. In general, the communication network can be any combination of connections and protocols that will support communication between client system 102 and computer server 104.

Client system 102 can be a desktop computer, a laptop computer, a tablet computer, a specialized computer server, a smartphone, or any other computer system known in the art. In certain embodiments, client system 102 represents a computer system utilizing clustered computers and components that act as a single pool of seamless resources when accessed through network 118, as is common in data centers and with cloud computing applications. In general, client system 102 is representative of any programmable electronic device, or combination of programmable electronic devices, capable of executing machine-readable program instructions and communicating with other computing devices via a network.

Computer server 104 can be a desktop computer, a laptop computer, a tablet computer, a specialized computer server, a smartphone, or any other computer system known in the art. In certain embodiments, computer server 104 represents a computer system utilizing clustered computers and components that act as a single pool of seamless resources when accessed through network 118, as is common in data centers and with cloud computing applications. In general, computer system 104 is representative of any programmable electronic device, or combination of programmable electronic devices, capable of executing machine-readable program instructions and communicating with other computing devices via a network. Exemplary components of computer system 104 are described in greater detail with regard to FIG. 4. Computer server 104 includes application server 106. Application server 106 includes the following modular application components: REST proxy 108, REST handler container 110, REST handlers 112 and 114, and REST helper 116.

Application server 106 is a software development and application runtime environment. Application server 106 provides software abstractions for services that are intended to be used by a large number of clients with access to computer server 104. In various embodiments of the present invention, the services of application server 106 can include one or more REST proxies, such as REST proxy 108, one or more REST handler containers, such as REST handler container 110, one or more REST handlers, such as REST handlers 112 and 114, and one or more REST helpers, such as REST helper 116. Application server 110 can be implemented using any dynamic programming framework with capability to allow a software developer to add, remove, or alter REST proxies, REST handler containers, REST handlers, and/or REST helpers without requiring application server 106 to restart and/or without requiring recompilation of the program code that defines application server 106 and its component parts (i.e., REST proxy 108, REST handler container 110, REST handlers 112 and 114, and REST helper 116). For example, application server 106 can utilize modular frameworks such as Open Source Gateway Initiative (OSGi™), JRebel®, Service Oriented Framework (SOF), OSGI4Cpp, or Portable Components (POCO) library, or any other modular framework that allows a software system to be separated into several smaller components which communicate via clearly defined interfaces.

REST proxy 108 is a layer of web application code embodied as a modular application component that is associated with a specific context root. A context root is a name that maps to a RESTful endpoint. REST requests transmitted by client system 102 to server computer 104 are associated with specified context roots (e.g., a URL). REST proxy 108 listens for requests associated with a specific context root, and delegates incoming requests to REST handler container 110 for processing of incoming REST requests. REST proxy 108 can be, for example, a servlet or an HTTP transport listener designed to listen to a specified context root and pass incoming REST requests to REST handler container 110. In various embodiments of the present invention, application server 106 can include multiple REST proxies, each of which listens to a different context root. By defining multiple REST proxies and other servlets, different application layers can use and share the same REST handler container, as well as the same REST handlers and REST helpers. For example, a first servlet may be configured to work with Java Management Extensions (JMX), while a second servlet may be configured to work with Legacy Java applications, but both servlets may pass requests to the same REST handler container for processing.

REST handler container 110 is a modular application component capable of receiving incoming REST requests from REST proxy 108, determining one or more REST handlers and/or REST helpers best suited to handle in the incoming requests, for example, through heuristic analysis of the REST requests, and designating the incoming REST requests to the one or more REST handlers and/or REST helpers. REST handler container 110 manages the life cycle of REST handlers 112 and 114 and REST helper 116, for example, by dictating when to call the REST handlers and REST helpers and when to remove them. REST handler container 110 maintains a list of all of the available REST handlers and REST helpers and an internal mapping mechanism that controls which REST handlers/REST helpers contribute to which REST proxies. REST handler container 110 can be implemented using any dynamic programming framework with capability to allow a software developer to add, remove, or alter REST proxies, REST handler containers, REST handlers, and/or REST helpers without requiring application server 106 to restart and/or without requiring recompilation of the program code that defines application server 106 and its component parts.

In various embodiments, multiple REST handler containers may exist within a single instance of application server 106. In such embodiments, application server 106 contains a primary REST handler container (i.e., REST handler container 110) and one or more background REST handler containers that can sync with the primary REST handler container at regular intervals. If the primary REST handler container fails or is deactivated, one of the background REST handler containers can declare itself as the new primary REST handler container and the application server will continue to function normally. Accordingly, embodiments of the present invention provide a high availability application server environment. In other embodiments, the multiple REST handler containers may provide internal load balancing functions for application server 106. For example, if application server 106 receives a REST request that contains code blocks that must be synchronized (i.e., executed by a single thread at a time), then the primary REST handler container can delegate waiting threads to one or more of the background REST handler containers so that parallel processing can occur and improve the functionality of application server 106.

REST handlers 112 and 114 are modular application components that provide the core logic for a given REST endpoint. REST handlers 112 and 114 can be implemented using any dynamic programming framework with capability to allow a software developer to add, remove, or alter REST handlers 112 and 114 without requiring application server 106 to restart, and/or without requiring recompilation of the program code that defines application server 106 and its component parts. REST handlers 112 and 114 each correspond to a RESTful endpoint, for example, a specific URI or URL. By having multiple REST handlers and REST helpers share a common REST handler container, each REST helper can contribute to more than just a single application, which reduces code duplication and allows for a platform in which each REST handler performs a specific type of logic and all applications can take advantage of the specialization. Because REST handlers 112 and 114 are implemented as modular application components, they may be added, removed, or modified remotely using existing commands within the modular framework (e.g., OSGi™).

REST helper 116 is a modular application component that provides a specific functionality which may be useful across multiple RESTful endpoints. For example, in one embodiment, a REST helper in an application server may handle adding HTTP headers to a request response to facilitate cross-origin resource sharing (CORS). In another embodiment, a REST helper can control routing within a cluster of computers. REST helper 116 can be implemented using any dynamic programming framework with capability to allow a software developer to add, remove, or alter REST helper 116 without requiring application server 106 to restart, and/or without requiring recompilation of the program code that defines application server 106 and/or its component parts.

In one embodiment, REST helper 116 enables a software developer to remotely deploy new REST handlers and/or REST helpers. In this embodiment, application server 106 includes a remote REST proxy configured to receive new REST handler and/or REST helper deployments at a specified context root. For example, a software developer can submit a standard PUT command to the remote REST proxy with a payload consisting of a binary representation (stub) of the new REST handler or REST helper in the same language that the application server framework is constructed in (e.g., OSGi™). The remote REST proxy instructs REST handler container 110 to REST helper 116. In this embodiment, REST helper 116 comprises a compiler for processing binary stubs and deploying new REST handlers or REST helpers within the framework.

Figure 2:
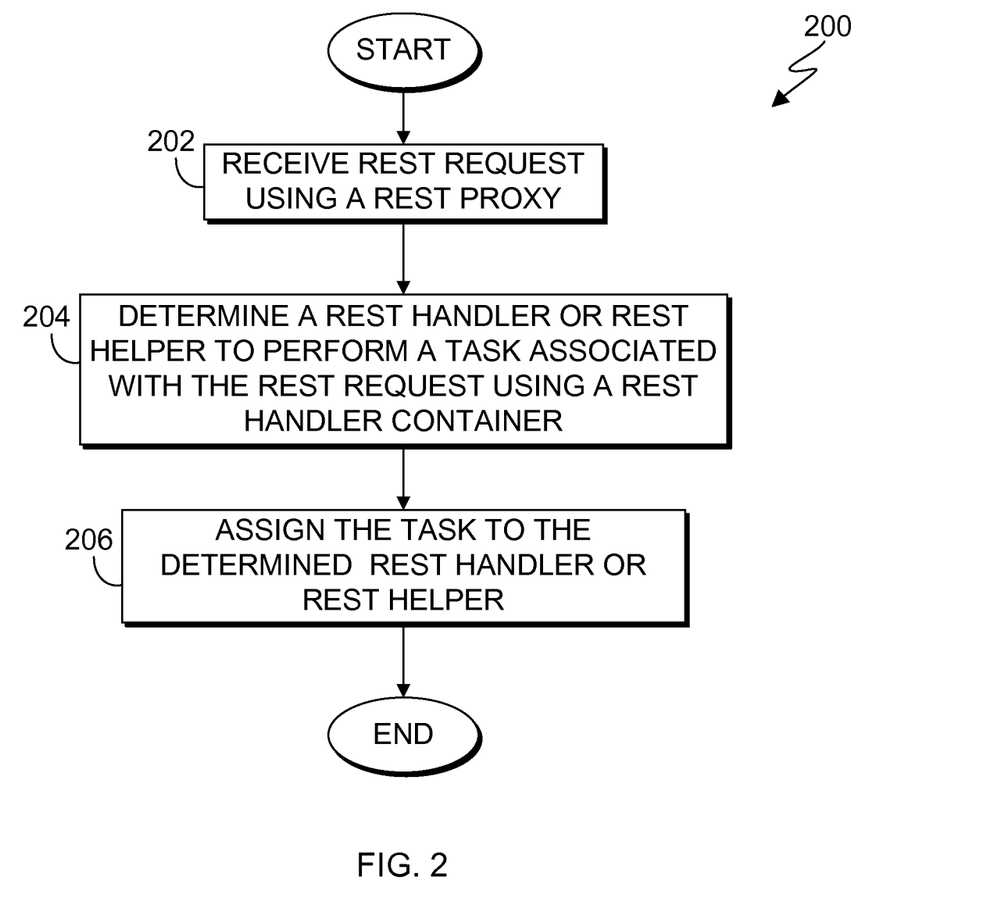
FIG. 2 is a flowchart depicting operational steps for handling a REST request, on a computer server within the environment of FIG. 1, in accordance with an embodiment of the present invention.

FIG. 2 is a flowchart depicting operational steps for handling a REST request, on a computer server within the environment of FIG. 1, in accordance with an exemplary embodiment of the present invention.

In step 202, application server 106 receives a REST request using REST proxy 108. In the exemplary embodiment of FIG. 2, client 102 transmits a REST request to server computer 104 via network 118. As discussed with respect to FIG. 1, REST proxy 108 is a modular construct that receives REST requests associated with a specific context root. For example, REST proxy 108 may be a servlet or HTTP transfer listener. REST proxy 108 provides a lightweight (relative to a complete application server) framework for receiving REST requests associated with specific context roots. In various embodiments of the present invention, REST proxy 108 provides only a front layer construct for receiving REST requests, and then passes the requests to REST handler container 110.

In step 204, application server 106 determines a REST handler or a REST helper to perform a task associated with the REST request using REST handler container 110. As discussed above, REST handler container is a modular container that manages the life cycles of one or more REST handlers and/or REST helpers. In the exemplary embodiment of FIG. 2, REST handler container 110 determines which REST handler or REST helper should handle a task associated with the received REST request using one or more heuristic matching mechanisms such as, path matching, service rank, routing requirements, or custom security. Path matching may, for example, include the matching of information included in the URL of the REST request with information associated with a REST handler indicating the type of REST requests that the REST handler can process. The information associated with the REST handlers that indicates specific functionality of the REST handlers may be included as part of the REST handler container.

In step 206, application server 106 assigns the task to the determined REST handler or REST helper. In the exemplary embodiment of FIG. 2, REST handler container 110 passes the REST request to a REST handler (e.g., REST handler 112) which performs the core logic for processing the REST request. For example, if an incoming REST request matches a specific path that is handled by a REST handler, as determined by REST handler container 110, the REST handler container 110 designates the REST request to the determined REST handler, which performs the tasks associated with the REST request and returns any information required to client 102.

Figure 3:
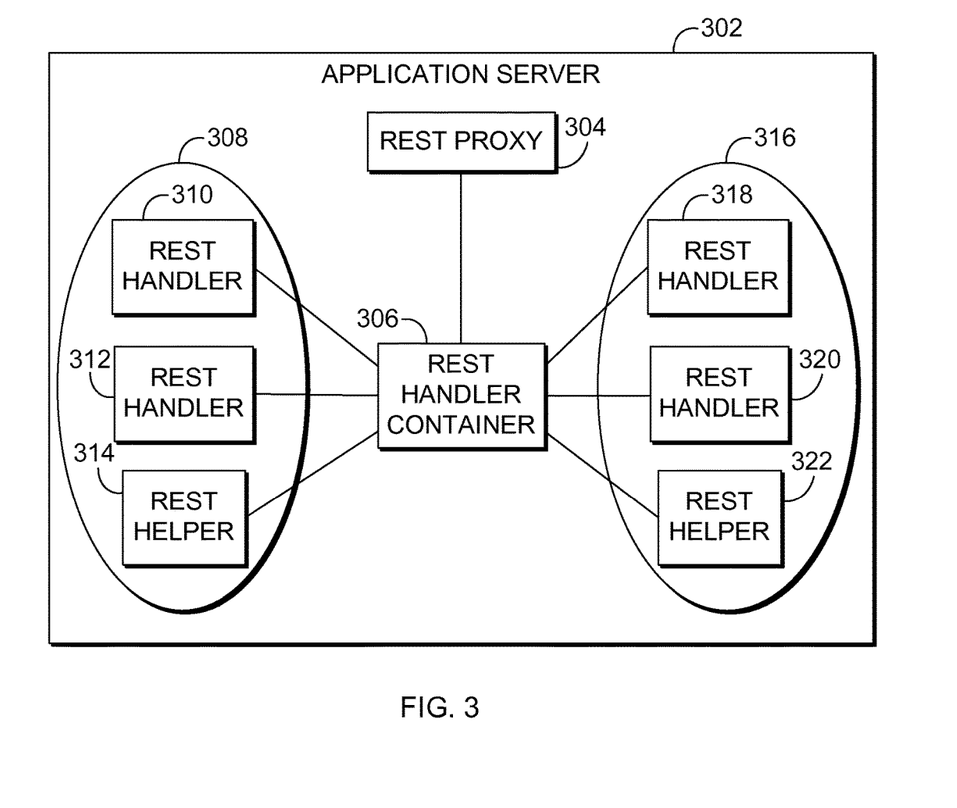
FIG. 3 is a functional block diagram illustrating a RESTful application server, in accordance with an embodiment of the present invention.

FIG. 3 is a functional block diagram illustrating a bundled RESTful application server, in accordance with an illustrative embodiment of the present invention. FIG. 3 provides a visual representation of modular REST handlers and REST helpers that enable embodiments of the present invention to provide users with dynamic management capabilities of the various RESTful endpoints associated with application server 302.

FIG. 3 provides an alternative embodiment of application server 106 from the exemplary embodiment of FIG. 1. In the illustrative embodiment of FIG. 3, application server 302 includes REST proxy 304 and REST handler container 306. REST proxy 304 and REST handler container 306 function in a similar way to REST proxy 108 and REST handler container 110 in FIG. 1. In the illustrative embodiment of FIG. 3, the various REST handlers and REST helpers are bundled together using a modular programming framework, such as OSGi™. In the illustrative embodiment of FIG. 3, REST handlers 310 and 312 and REST helper 314 are bundled together into bundle 308. Similarly, REST handlers 318 and 320 and REST helper 322 are bundled together into bundle 316. In certain embodiments, REST handlers and REST helpers are bundled together based on similar functionality. Additionally, bundling enables software developers responsible for maintaining the application server to easily add, remove, or modify the components of the application server using pre-existing commands for the modular framework utilized in constructing the application server environment.

Figure 4:
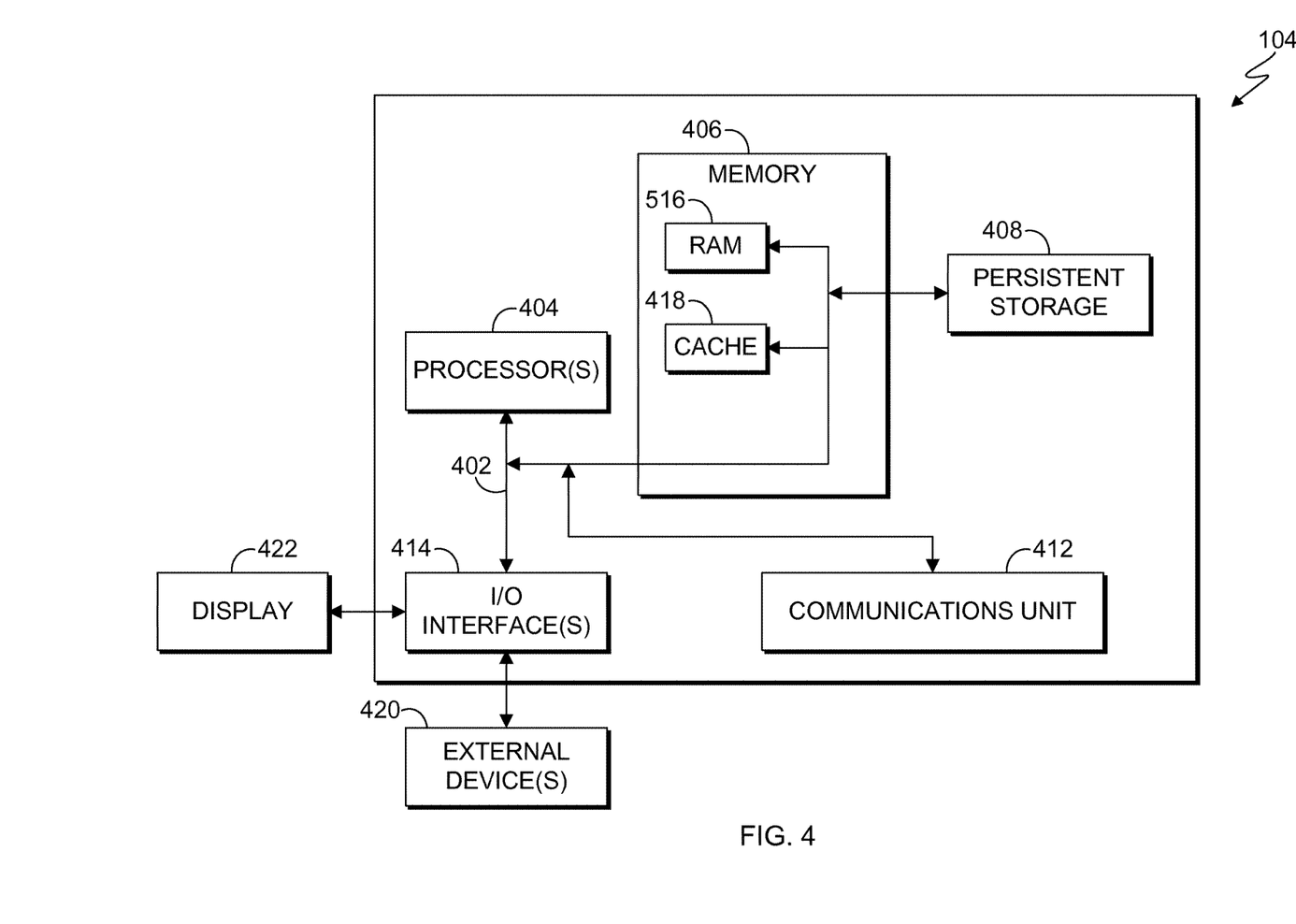
FIG. 4 depicts a block diagram of components of the computer server executing the application server, in accordance with an embodiment of the present invention.

FIG. 4 depicts a block diagram of components of computer server in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer server 104 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Application server 106 is stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Application server 106 may be downloaded to persistent storage 408 through communications unit 412.

I/O interface(s) 414 allows for input and output of data with other devices that may be connected to computer server 104. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention, e.g., application server 106, can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically managing RESTful endpoints, the method comprising:

receiving, by one or more computer processors, a REST request using a proxy, wherein the proxy is a first modular application component that receives REST requests associated with a context root, wherein the REST request refers to stateless protocols for servicing the REST request;

determining, by one or more computer processors, using a second modular application component, a third modular application component from a plurality of modular application components for processing the REST request wherein the second modular application component selects, using one or more heuristic matching techniques, the third modular application component for processing the REST request; and processing, by one or more computer processors, the REST request using at least the third modular application component.

2. The method of claim 1, wherein the one or more heuristic matching techniques comprise at least one of path matching, service rank, routing requirements, or custom security.

3. The method of claim 1, wherein the REST request comprises a binary representation of a fourth modular application component, and the third modular application component comprises a binary compiler for converting the REST request into the fourth modular application component capable of processing REST requests.

4. The method of claim 3, further comprising:

creating, by one or more computer processors, the fourth modular application component, wherein the fourth modular application component can process one or more REST requests.

5. The method of claim 1, wherein one or more of the plurality of modular application components are grouped into one or more bundles, wherein the one or more bundles may be modified without recompiling the plurality of modular application components.

6. The method of claim 1, further comprising:

generating, by one or more computer processors, one or more redundant instances of the second modular application component.

7. The method of claim 6, further comprising:

determining, by one or more computer processors, that the second modular application component has become unavailable; and responsive to determining that the second modular application component has become unavailable, replacing the second modular application component with at least one of the one or more redundant instances of the second modular application component.

* * * * *